Patented July 6, 1926.   BEST AVAILABLE COPY   1,591,785

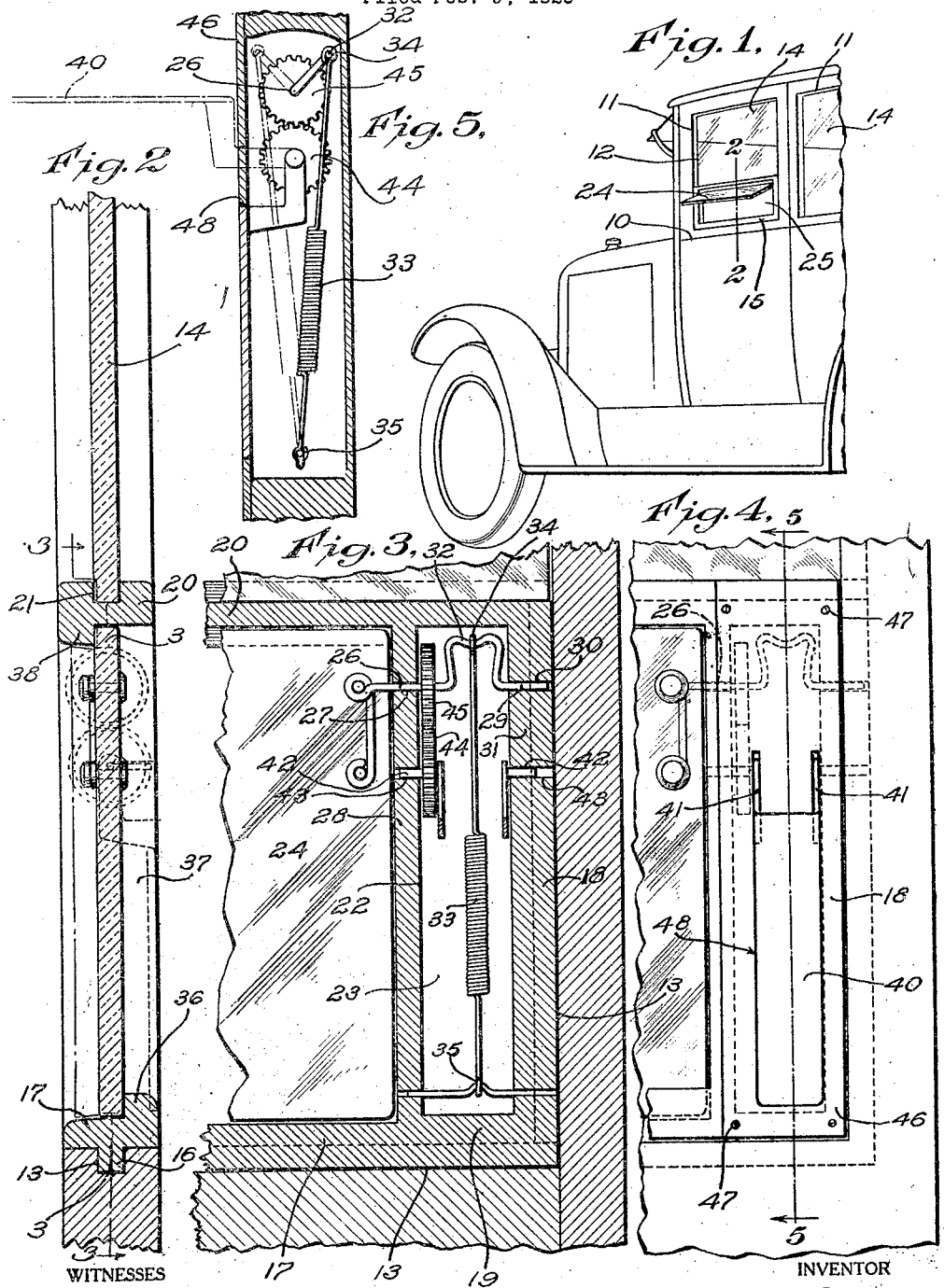

UNITED STATES PATENT OFFICE.

JOSEPH SHARKEY, OF BROOKLYN, NEW YORK.

SIGNALING WINDOW FOR AUTOMOBILES.

Application filed February 9, 1925. Serial No. 8,083.

This invention relates to an accessory for motor vehicles and has particular reference to a signaling window for motor vehicles of the closed type by means of which the usual hand signals required by law to be given by the driver to following or approaching traffic may be effected without the necessity of opening the window adjacent the driver's seat.

As now constructed automobiles and other motor vehicles of the closed type are equipped with windows movable in a vertical plane and opened by lowering the same to the lower portion of the door, the movement of the window from a closed to open position being impractical in the short space of time necessary to give an emergency signal and therefore necessitating the leaving of the window in partially opened condition for signaling purposes. It necessarily follows that the occupants of the vehicle in extremely cold or stormy weather suffer untold discomfort and it is therefore the main object of the present invention to provide a device which affords a means for instantaneously effecting an opening through which the driver may project his hand for giving the hand signals and which device is normally closed when not in active use.

To this end it is therefore essential to provide a device which is preferably in the nature of an accessory whereby the same may be readily installed in the window of the car adjacent the driver's seat and which will in no way affect the operation of the window to open and close the same by the usual means now employed.

The invention furthermore comprehends a device constituting an attachment for a built-in part of the usual type of closed car which device is comparatively simple in its construction and mode of operation, which is inexpensive to manufacture and install and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 illustrates diagrammatically a signaling window for motor vehicles of the closed type with the window closure in its opened condition to admit of the projection of the hand therethrough for signaling purposes.

Fig. 2 is a fragmentary vertical sectional view on an enlarged scale taken approximately on the line indicated at 2—2 in Fig. 1.

Fig. 3 is a fragmentary vertical sectional view taken approximately on the line indicated at 3—3 in Fig. 2.

Fig. 4 is a fragmentary inside elevation.

Fig. 5 is an enlarged detail vertical sectional view taken approximately on the line indicated at 5—5 in Fig. 4.

Referring to the drawings by characters of reference 10 designates the body of a motor vehicle of the closed type which is provided with the usual window openings 11 in which vertically slidable window frames 12 are arranged for vertical sliding movement so that the same may be lowered or raised to respectively open or close the window opening. The frames 12 are channeled or grooved as at 13 to receive the usual transparent or glass panels 14 which are fitted in the same and said frames and panels are movable in unison by any well-known operating means now in general use. As heretofore explained it is necessary to leave the window adjacent the driver's seat open for the purpose of projecting the hand therefrom to give the usual hand traffic signals required by law due to the fact that the operation of opening the window in an emergency requires a greater length of time than is practical.

In order to overcome the above and hence to provide means which while normally closed may be instantly opened to afford an opening through which the hand may be projected to give the signals, the device constituting the present invention has been devised. Said device preferably is in the nature of an accessory or attachment which includes a frame 15 having a tongue 16 at the lower end of its lower cross rail 17 and tongues 18 at the outer sides of its side rails 19 which are of a size to be snugly received by the grooves or channels 13 of the window frame 12. The upper cross rail 20 of the frame 15 is provided on its upper edge with a groove or channel 21. The usual glass panel 14 is cut off so that the same fits between the upper rail of the window frame 12 and the upper cross rail 20 of the frame 15 with the lower edge of the panel 14 received in the groove or channel 21 of the cross rail 20. The frame 15 is of a thickness substantially equal to the thickness of the window frame 12 whereby it will in no way interfere with the vertical sliding movement of the window frame in its usual guides and receiving compartment. The opposite side rails 18 of the frame 15 are provided on their inner sides with recesses 22 which define compartments 23 for housing a mechanism for mounting and retaining the closure panel 24 in its open and closed positions. The side rails 18 and the upper and lower cross rails 20 and 17 of the frame 15 define a signaling window opening 25 in which the closure panel 24 is mounted in a normal vertical plane to close the opening and capable of outward and upward swinging movement to open the signaling window opening 25. Adjacent its upper end the panel has attached thereto in any suitable manner a pair of laterally projecting trunnions 26 which extend through bearing openings 27 in the inner side walls 28 of the recesses 22 which define the compartments 23. The free terminals 29 of the trunnions are extended into bearing openings 30 in the outer side walls 31 which define the recesses 22 and the intermediate portion of the trunnions which lie within the recesses 22 are laterally offset to provide cranks 32. A coiled contractile spring 33 has one of its terminals 34 connected with the offset or crank portion 32 and its opposite terminal 35 anchored at a point adjacent the bottom of the recess defining the housing 23. The inner side of the upper face of the lower cross rail 17 is formed with an upstanding bead or flange 36 and the inner side of each inner wall 28 is formed with a corresponding stop bead or flange 37 which extends upwardly to a point slightly below the trunnions 26. The upper cross rail 20 is provided adjacent its outer side with a depending flange or bead 38 against which the upper edge of the panel is adapted to contact when said panel is in its vertical closed position within the window opening 25. The offset or crank portions 32 are so disposed at an outward angle when the panel is in its closed position as to permit the spring to effectually maintain the lower inner edge and side inner edges in engagement with the stop flanges or beads 36 and 37 whereby said panel is held against casual movement or displacement by the tension of the spring which tends to effect a further downward swinging movement of the offset or crank portions 32. It is however obvious that a slight pressure exerted by the hand against the panel 24 from within will move the cranks past a vertical dead center whereby said cranks will be disposed at an inward angle and the tension of the springs will function to exert a further downward pull to swing the lower end of the panel outwardly and upwardly to substantially a horizontal position to which point the inner face of the panel adjacent the upper edge engages with the upper ends of the side flanges or beads 37 to arrest further upward movement. It thus follows that a free and unobstructed passage or window opening 25 is afforded to allow for the projection of the hand of the driver to effect the usual hand traffic signals.

In order to provide means for closing the signaling window closure panel 24 to a normal vertical position a manipulating handle 40 is provided which is preferably of U-shape cross sectional configuration cut away at its upper end to provide ears 41 having laterally projecting trunnions 42 mounted in bearing openings 43 in the side walls 28 and 31 of one of the recesses 22, preferably the one adjacent the forward end of the vehicle. One of the trunnions 42 has secured thereon a gear or pinion 44 which meshes with a gear or pinion 45 on the panel trunnion 26. When the panel 24 is opened, the manipulating handle 40 through the intermeshing gears or pinions 44 and 45 swings inwardly and upwardly so that the same is in position to be readily moved downwardly by the hand after the signaling operation is completed. The downward movement of the handle 40 through the intermeshing gears 44 and 45 turns the trunnion 26 in a direction to effect the return movement of the panel 24 to a closed position. Preferably the rear open sides of the recesses 22 defining the housings or compartments 23 are closed by covering plates 46 which are retained in place by anchoring screws or other fastening device 47 to allow for the removal of the plates to effect repairs or adjustments to the operating mechanism. The plate 46 which covers the mechanism to which the manipulating handle 40 is attached is preferably cut away as at 48 so that the handle 40 closes flush into the cut-away portion 46 when the panel 24 is closed and swings outwardly therefrom when the panel is open. It is of course to be understood that while the device has been especially designed as an accessory or an attachment so that the same may be installed on cars or vehicles which have been previously built, the same may be initially built into and form a part of the window frame of newly constructed cars or vehicles without in any way departing from the scope or spirit of the invention.

I claim:

1. The combination with a closed vehicle having a vertically slidable window therein adjacent the driver's seat of a signaling section forming the lower end of said window, and mounted to swing upwardly and outwardly when manually pushed from the inside of the vehicle, self-locking spring devices for rapidly swinging said section to open position after it has been initially manually moved and handle means operated by the spring devices and swinging inwardly and upwardly as the section swings to open position.

2. In a closed motor vehicle provided with a vertically slidable window adjacent the driver's seat, a signaling section forming the lower portion of said window and pivoted near its upper edge to swing upwardly and outwardly, a handle associated with said section, means for automatically swinging said handle upwardly and inwardly as the section is moved to open position, and means whereby depression of the handle restores the section to closed position.

JOSEPH SHARKEY.